(12) United States Patent
Andersen

(10) Patent No.: US 8,379,353 B2
(45) Date of Patent: *Feb. 19, 2013

(54) METHOD FOR DETECTING EARTH-FAULT CONDITIONS IN A MOTOR CONTROLLER

(75) Inventor: Henrik Rosendal Andersen, Graasten (DK)

(73) Assignee: Danfoss Drives A/S, Graasten (DK)

( * ) Notice: Subject to any disclaimer, the term of this patent is extended or adjusted under 35 U.S.C. 154(b) by 0 days.

This patent is subject to a terminal disclaimer.

(21) Appl. No.: 13/166,948

(22) Filed: Jun. 23, 2011

(65) Prior Publication Data

US 2011/0249368 A1    Oct. 13, 2011

Related U.S. Application Data

(63) Continuation of application No. 11/722,758, filed as application No. PCT/DK2004/000920 on Dec. 27, 2004, now Pat. No. 8,023,234.

(51) Int. Cl.
*H02H 3/00* (2006.01)
(52) U.S. Cl. ........................................... 361/42
(58) Field of Classification Search ..................... 361/42
See application file for complete search history.

(56) References Cited

U.S. PATENT DOCUMENTS

| | | | | |
|---|---|---|---|---|
| 5,214,575 A | * | 5/1993 | Sugishima et al. | 363/37 |
| 5,483,167 A | * | 1/1996 | Mikami | 324/510 |
| 5,768,079 A | * | 6/1998 | Buell | 361/78 |
| 6,856,137 B2 | * | 2/2005 | Roden et al. | 324/509 |
| 7,233,465 B2 | * | 6/2007 | Lee | 361/42 |
| 8,023,234 B2 | * | 9/2011 | Andersen | 361/42 |

* cited by examiner

*Primary Examiner* — Stephen W Jackson
(74) *Attorney, Agent, or Firm* — McCormick, Paulding & Huber LLP

(57) ABSTRACT

The present invention relates to a method for determining the existence of an earth-fault on-the-fly and thereby protecting a motor controller having a high- and a low-side DC-link, and having high- and low-side switching elements, the high- and low-side switching elements being operatively connected to the high- and low-side DC-link buses, respectively, the method comprising the steps of generating a fault signal, generating at least one test vector in response to the fault signal by switching at least one of the switching elements on, and measuring, while the at least one switching element is on, the magnitude of a current flowing in that DC-link operatively connected to the conducting switching element in order to detect an earth-fault. The present invention further relates to additional methods for on-the-fly determination of earth-faults.

20 Claims, 5 Drawing Sheets

METHOD FOR DETECTING EARTH-FAULT CONDITIONS IN A MOTOR CONTROLLER

CROSS REFERENCE TO RELATED APPLICATIONS

The present application is a continuation application of U.S. patent application Ser. No. 11/722,758 filed Jul. 20, 2007, which is entitled to the benefit of International Patent Application No. PCT/DK2004/000920 filed on Dec. 27, 2004, which are both hereby incorporated by reference in their entirety.

FIELD OF THE INVENTION

The present invention relates to a method for determining the existence of an earth-fault on-the-fly and thereby protecting a motor controller having a high- and a low-side DC-link. The method according to the present invention is able to distinguish between differential-mode over currents and common-mode over currents.

BACKGROUND OF THE INVENTION

Motor controllers for AC-motors etc. need to know whether an earth-fault (common-mode fault) exists during operation. This type of fault should be distinguished from differential-mode faults such as for example over currents caused by a blocked rotor of the motor.

Those skilled in the art will acknowledge the following priority of excessive current in a motor controller.
 a. Short-circuit currents in the range of the saturation level of the switching elements should cause a permanent shutdown to be initiated within microseconds regardless of whether the low-impedance problem is of a common- or differential-mode nature.
 b. Over currents caused by common-mode faults with current-limiting impedance in the earth loop should be limited to an upper level for a given time period in the range of milliseconds before a permanent shutdown is initiated.
 c. Over currents caused by load-related differential-mode faults should be limited to an upper level for a given time period in the range of seconds before a permanent shutdown is initiated.

Motor controllers with a short-to-earth on an output phase are likely to be categorized as exhibiting an item b. problem, when the rectifier-side employs inductance for line-current harmonics limitation in accordance with IEC1000-3-2 or IEC1000-3-12. The difference between item b. and c. is that common-mode faults will stress the rectifier part with high-frequency currents, which differential-mode faults do not. The rectifier stress may lead to catastrophic failures if the duration exceeds the millisecond range.

The VLT5000 produced by Danfoss Drives NS since 1995 employs 3 current transducers on the output phases. By summing the current transducer signals an earth-fault signal is generated. Hence, this principle is always able to differ between differential and common-mode faults. The drawback of this solution is cost-related.

The VLT2800 produced by Danfoss Drives NS since 1998 employs a shunt in the lower DC-link bus to sense differential-mode currents, and a common-mode summing current transformer in the rectifier part to sense earth currents. Hence, this principle is able to differ between differential and common-mode faults. A similar approach is suggested in U.S. Pat. No. 5,687,049 where the summing transformer is placed in the inverter stage of the motor controller. Though this solution exhibit lower costs than the VLT5000 solution, both solutions will result in a problematic PCB layout due to more current sensing elements in the DC-link.

U.S. Pat. No. 5,687,049 proposes a solution with a high and low-side current sensing element in the inverter part of the DC-link bus. Summing the 2 sensing signals (where at least one needs to employ galvanic/functional isolation) gives an earth-current signal similar to the VLT5000 solution. Hence, this solution is able to differ between item b. and c. However, the practical PCB layout issue is a drawback.

The IAS'96 conference paper "Single Current Sensor Technique in the DC-link of Three-phase PWM-VS Inverters A Review and the Ultimate Solution" and U.S. Pat. No. 5,687,049 report a solution with a current transducer having both the positive and negative DC-link bus wired through the transducer with an unequal number of turns. This reduces the count of current sensing elements to unity and is reported as the "ultimate solution" for protecting a motor controller (will differ between item b. and c.). However, those skilled in the art will acknowledge that this kind of multiple turns in a current transducer may compromise an optimum coupling and give excessive leakage inductance in the inverter side of the DC-link. Also, the PCB layout is problematic. Furthermore, design and automatic assembly become difficult with multiple turns having different voltage potentials in a modern small-sized current transducer.

Hence, the present invention is preferably used along with the following hardware combinations considered to be best-suited for a modern, low-cost and robust motor controller.
 1. Motor controller with an inverter stage employing a shunt in series with each of the low-side switching elements and desaturation protection of the high-side switching elements.
 2. Motor controller with a shunt in the low-side DC-link bus and de-saturation protection of the high-side switching elements.
 3. Motor controller with a current transducer in the low- or high-side DC-link bus and de-saturation protection of the high- or low-side switching elements.

Items 1 and 2 assume that the control circuitry for the motor controller is referenced to the low-side DC-link bus. Item 3 assumes that the control circuitry is galvanically isolated from the power stage. The current sensing element(s) gives a feedback to the control circuitry in the motor controller. The de-saturation protection is used to protect the switching elements in the opposite side of where the current sensing element(s) is placed. The de-saturation protection may be with or without galvanically/functionally isolated feedback to the control circuitry as described in U.S. Pat. No. 5,687,049.

De-saturation protection without feedback is patented in U.S. Pat. No. 5,687,049 meaning that the switching elements with de-saturation protection operates on a self-protective, cycle-by-cycle basis until the central control circuitry shuts down the inverter stage in response to a fault signal from the current sensing element. De-saturation protection with feedback is well known and offered by many gate drive vendors at least since the early $1990^{th}$ —for example the IXYS driver chipset IXPD4410 and IXPD4411.

The preferred hardware configurations will not be able to distinguish between a common-mode and differential-mode fault condition as the other solutions. Intelligent sampling of the DC-link current sensing element(s) is required. The above IAS'96 paper teaches that the earth-fault current may be sampled during the zero-voltage vectors 000 or 111. However, the method suggested in IAS'96 does not offer the possibility that the phase connected to the earth-fault may be identified.

Hence, the information is available on a switching-period basis as long as a zero-voltage vector is available. EP 0 490 388 discloses a principle of receiving an over-current fault signal, a first action is to generate a signal from the PWM sequence to determine whether the fault occurred during a zero-voltage vector or an active vector. This will differ between item b. and c. above. However, the patent does not consider the problem that the zero-voltage vector may not exist generally in all operating points.

An industrial standard for PWM generation is the space-vector-modulation reported in the PESC'90 conference paper "Stator Flux Oriented Asynchronous Vector Modulation for AC-Drives" (referred to as SFAVM below) along with all the variants of SFAVM generated by varying the zero-voltage-vector distribution. The goal of these PWM strategies is to obtain optimised motor performance in terms of torque and current ripple, losses, acoustic noise and voltage-transfer ratio from input to output. It is well known that SFAVM uses the zero-voltage vectors in every switching period at low output voltages. However, at high output voltage the use of the zero-voltage vectors is minimized. In some switching cycles the zero-voltage vectors may not be used, especially in the over-modulation range. And in some cycles the zero-voltage vectors may be used for a short time only, meaning that a proper measurement of an earth current during a zero-voltage vector becomes practically impossible. The problem becomes even worse as the switching frequency is increased.

SUMMARY OF THE INVENTION

The scope of the present invention is to generate the required zero-voltage vector on a regular basis ("on-the-fly") even though the normal optimised PWM pattern (SFAVM etc.) of the motor controller does not command this. The scope is to implement this while ensuring that there is a minimum impact on the normal high-quality PWM.

1. A first principle is to generate the required zero-voltage test vector for a sufficient time period to measure the earth current accurately, if not commanded by the normal PWM pattern, at a rate lower than the switching frequency. This reduces undesirable effects on the motor performance.
2. The next principle is that any error made in each phase duty cycle in response to the additional zero-voltage vector is corrected later in time to compensate for unbalance in the multi-phase PWM system.
3. Preferably items 1. and 2. are generated synchronously to the fundamental motor frequency, such that half-wave and quarter-wave symmetry is obtained relative to the phase duty-cycle curves over the fundamental period.
4. Typically items 1., 2., and 3. are required at high output voltage. At low voltages a sufficient zero-voltage-vector time is always available in every switching cycle.
5. To compensate for the fact that the zero-voltage vector and the earth-fault test are only executed at a fraction of the switching cycles, a backup principle is that the zero-voltage test vector is always generated just before re-enabling normal PWM after having received a fault signal commanding that the inverter switching elements should be turned off until the fault signal disappears. The fault signal may be caused by an over-current condition etc. Hence, in a disable/enable PWM sequence to provide a fault ride-through capability for the motor controller, the test vector is frequently used giving the desired differentiation between item b. and c. The philosophy is that during this kind of disable/enable ride-through sequence the normal PWM quality is ruined anyway. Therefore the test vector may be applied more frequently than in item 1.

The invention is not limited to the industrial standard SFAVM. Any other PWM scheme relying on either a pre-calculated, optimized pattern as well as various current-controlled PWM schemes etc. are also considered in combination with the invention.

In a first aspect, the present invention relates to a method for determining the existence of an earth-fault on-the-fly and thereby protecting a motor controller having a high- and a low-side DC-link, and having high- and low-side switching elements, the high- and low-side switching elements being operatively connected to the high- and low-side DC-link buses, respectively, the method comprising the steps of generating a fault signal, said fault signal indicating abnormal working conditions for the motor controller, generating at least one test vector in response to the fault signal by switching at least one of the switching elements on, and measuring, while the at least one switching element is on, the magnitude of a current flowing in that DC-link operatively connected to the conducting switching element(s) in order to detect an earth-fault.

By on-the-fly is meant that the steps of the method should be completed within a time interval similar to the electrical time constant of the AC-motor in order to be able to regain full stability/control of the AC-motor. At least, the steps of the method should be completed within a fraction of the period of the fundamental output voltage of the motor controller. The number of the switching elements in the motor controller may in principle be arbitrary—thus, the number of switching may be 2, 4, 6, 8, 10 or even higher.

The method may further comprise the step of switching all switching elements off prior to switching the at least one switching element on.

In one embodiment of the present invention test vectors are applied by switching the switching elements operatively connected to the high-side DC-link on in a sequential manner. In case of a motor controller having six switching elements test vectors may be applied by switching three switching elements operatively connected to the high-side DC-link on in a sequential manner.

In another embodiment of the present invention test vectors are applied by switching the switching elements operatively connected to the low-side DC-link on in a sequential manner. Again, in case of a motor controller having six switching elements test vectors may be applied by switching three switching elements operatively connected to the low-side DC-link on in a sequential manner.

In yet another embodiment of the present invention a test vector is applied by switching the switching elements operatively connected to the high-side DC-link on at essentially the same time. In case of six switching elements in the motor controller a test vector is applied by switching three switching elements operatively connected to the high-side DC-link on at essentially the same time.

In yet another embodiment of the present invention a test vector is applied by switching the switching elements operatively connected to the low-side DC-link on at essentially the same time. In case of six switching elements in the motor controller a test vector is applied by switching three switching elements operatively connected to the low-side DC-link bus on at essentially the same time.

The same test vector may be applied a number of times. During the appliance of said test vector, the magnitude of the current flowing in the DC-link operatively connected to the repeatedly conducting switching element(s) is measured a corresponding number of times. By applying the test vector in such a repeatedly manner, measurements may be confirmed before a decision of for example permanent shut-down is taken and implemented.

The generated fault signal may be provided by current sensing means measuring the current in one of the DC-link buses of the motor controller. The current sensing means may for example provide information regarding the magnitude of the current flowing in that DC-link operatively connected to the conducting switching element(s).

All steps relating to turning the switching elements on and off, processing of the fault signal, and the measuring of the magnitude of the current in a DC-link of the motor controller may be controlled by a motor controller unit, such as a DSP.

The fault signal may be an indication for short circuit currents or over currents in one of the DC-link buses of the motor controller. The fault signal may also be an indication for an over voltage across at least one of the switching elements of the motor controller. Such over voltage may be detected by a desaturation protection circuit. Generally speaking, the fault signal may be an indication of basically any abnormal working condition for the motor controller, such as abnormal temperature, abnormal voltages, and abnormal currents.

The method according to the first aspect of the present invention may further comprise the step of permanently shutting down the motor controller if an earth-fault is determined.

In a second aspect, the present invention relates to a method for determining the existence of an earth-fault on-the-fly and thereby protecting a motor controller having a high- and a low-side DC-link, and having high- and low-side switching elements, the high- and low-side switching elements being operatively connected to the high- and low-side DC-link buses, respectively, the motor controller further comprising a motor controller unit for controlling when the switching elements are to be switched on and off by generating a PWM signal to each of the switching elements, the method comprising the steps of modifying the generated PWM signal by increasing the duty cycle of at least one of the PWM signal applied to the low-side switching elements, the increase of the duty cycle having a time period being a fraction of the switching period of the low-side switching elements, generating and hereby applying a 000 test vector, and measuring, while the low-side switching elements are on, the magnitude of a current flowing in the low-side DC-link in order to detect an earth-fault, wherein the 000 test vector is generated and applied at a rate lower than the switching frequency of the low-side switching elements.

By the notation 000 test vector is meant that the three switching elements operatively connected to the low-side DC-link are switched on. The ratio between the rate at which the test vector is generated and applied, and the switching frequency of the low-side switching elements is typically in the range 0.05-0.5.

The method according to the second aspect of the present invention may further comprise the step of modifying the generated PWM signal by reducing the duty cycle of the PWM signal applied to the low-side switching elements so as to compensate for the previously increased duty cycle.

In a third aspect, the present invention relates to a method for determining the existence of an earth-fault on-the-fly and thereby protecting a motor controller having a high- and a low-side DC-link, and having high- and low-side switching elements, the high- and low-side switching elements being operatively connected to the high- and low-side DC-link buses, respectively, the motor controller further comprising a motor controller unit for controlling when the switching elements are to be switched on and off by generating a PWM signal to each of the switching elements, the method comprising the steps of modifying the generated PWM signal by increasing the duty cycle of at least one of the PWM signals applied to the high-side switching elements, the increase of the duty cycle having a time period being a fraction of the switching period of the high-side switching elements, generating and hereby applying a 111 test vector, and measuring, while the high-side switching elements are on, the magnitude of a current flowing in the high-side DC-link in order to detect an earth-fault, wherein the 111 test vector is generated and applied at a rate lower than the switching frequency of the high-side switching elements.

By the notation 111 test vector is meant that the three switching elements operatively connected to the high-side DC-link are switched on. The ratio between the rate at which the test vector is generated and applied, and the switching frequency of the low-side switching elements is again typically in the range 0.05-0.5.

The method according to the third aspect may further comprise the step of modifying the generated PWM signal by reducing the duty cycle of the PWM signal applied to the high-side switching elements so as to compensate for the previously increased duty cycle.

The method according to the second and third aspects of the present invention may be applied synchronously with a fundamental output voltage from the motor controller.

In a fourth aspect, the present invention relates to a method for determining the existence of an earth-fault on-the-fly and thereby protecting a motor controller, the method comprising the step(s) of repeatedly applying the method according to the second and third aspect of the present invention.

In case an earth-fault is detected by applying the methods according to the second, third, and fourth aspect, the method according to the first aspect may be applied.

In a fifth and final aspect, the present invention relates to a motor controller comprising means for configuring the motor controller to perform any one of first, second, third and fourth aspects of the present invention.

BRIEF DESCRIPTION OF THE DRAWINGS

The present invention will now be explained in further details with reference to the accompanying figures, wherein.

Figure 1:
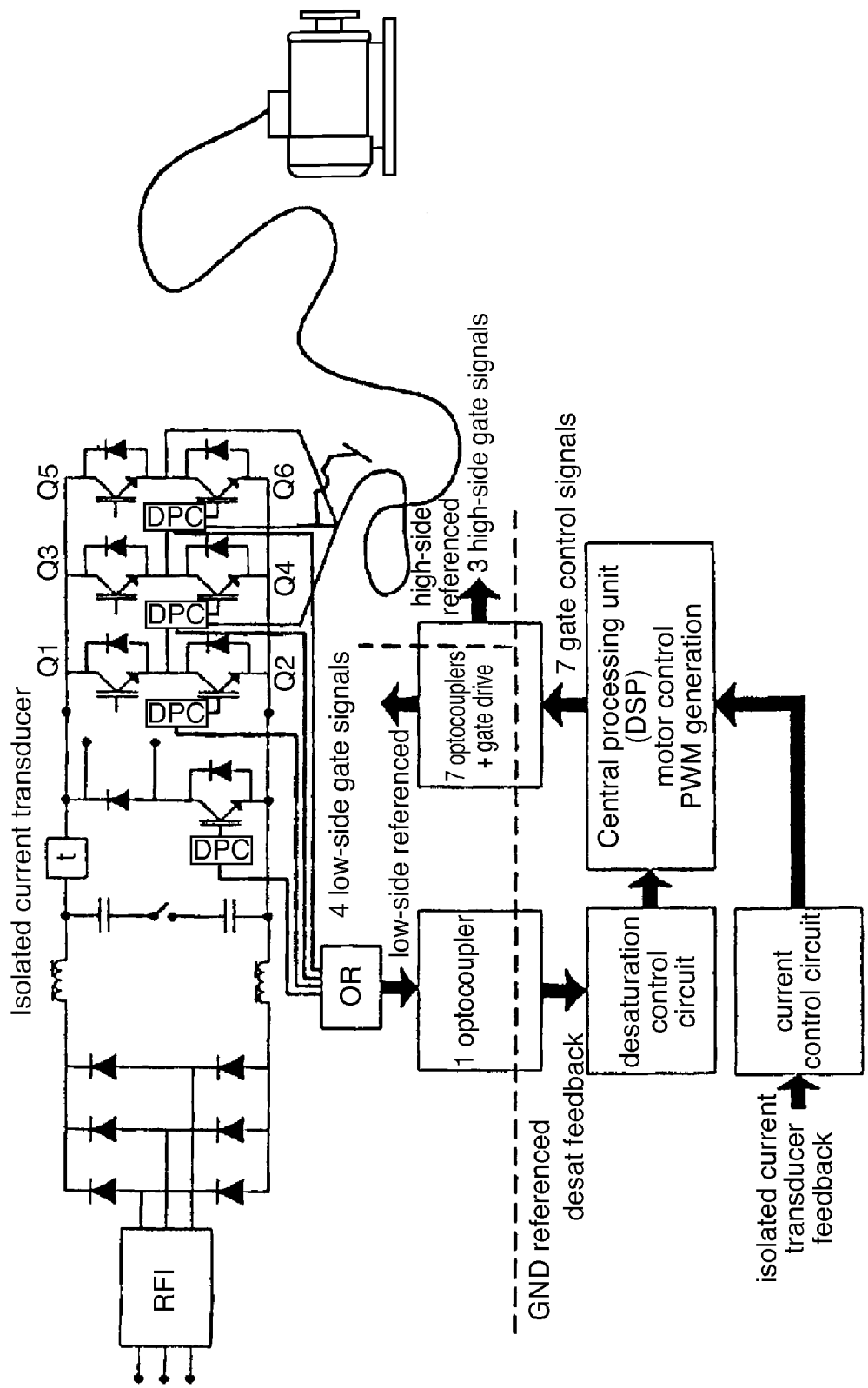
FIG. 1 shows one of the possible hardware configurations suited for the invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

FIG. 1 shows a motor controller designed according to configuration three, i.e. having a current transducer in the high-side DC-link and a desaturation protection circuit placed in the gate driver of the low-side switches of the inverter. A brake circuit comprising two diodes and a switch with a desaturation protection circuit is via the desaturation protection connected to an OR gate (brake resistor not showed). The OR gate goes high, if one of the desaturation protection-circuits signals a saturation condition across a switch.

In a conventional manner, the motor controller further comprises a three-phase rectifier and coils inserted in the high- and low-side DC-link buses. The coils act as chokes to reduce mains retroaction. An optional Radio-Frequency Interference (RFI) filter is placed on the input to the rectifier.

The control section of the motor controller comprises a digital signal processor (DSP), which performs the overall motor control and generates the PWM control signals, which are led to a galvanic isolation consisting of seven optocouplers, one optocoupler for each inverter switch and one for the brake switch. Correspondingly, the signals from the desaturation protection circuits are galvanically isolated by an optocoupler and fed to a desaturation control circuit, which is connected to the DSP. A current-control circuit is connected to the current transducer and to the DSP. The control section is electrically referenced to ground. In operation, the inverter switches are pulse-width modulated, and electrically connected to a three phase AC motor.

If a short circuit between one of the three motor phases and earth incidentally arises (FIG. 1 shows such a fault on the output between switch Q3 and Q4), an item b problem has emerged, i.e. an earth-fault with current-limiting impedance in the earth loop. The coils in the DC-link function as the current limiting impedance, until saturation occurs. Due to the reduced amperage of the current, the acceptable reaction time is in the millisecond range and not in the microsecond range. This fault condition may be detrimental to the rectifier due to repetitive spikes on the pulsating DC voltage.

Figure 2:
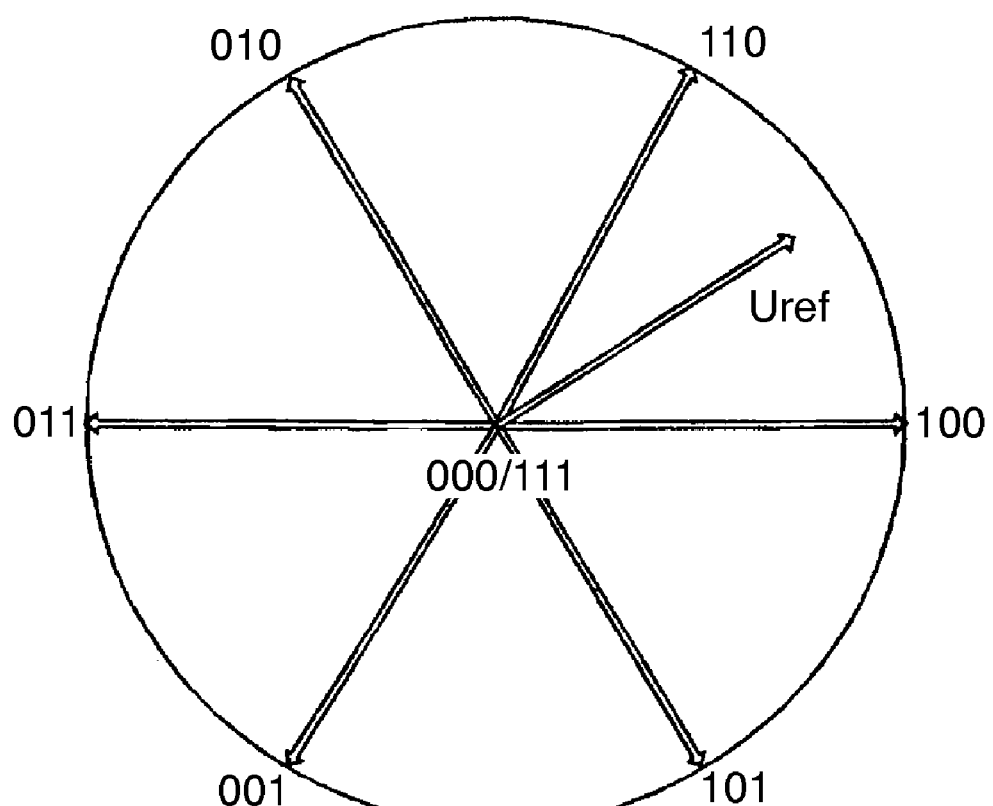
FIG. 2 shows the 8 voltage vectors in a 3-phase motor controller.
Figure 5:
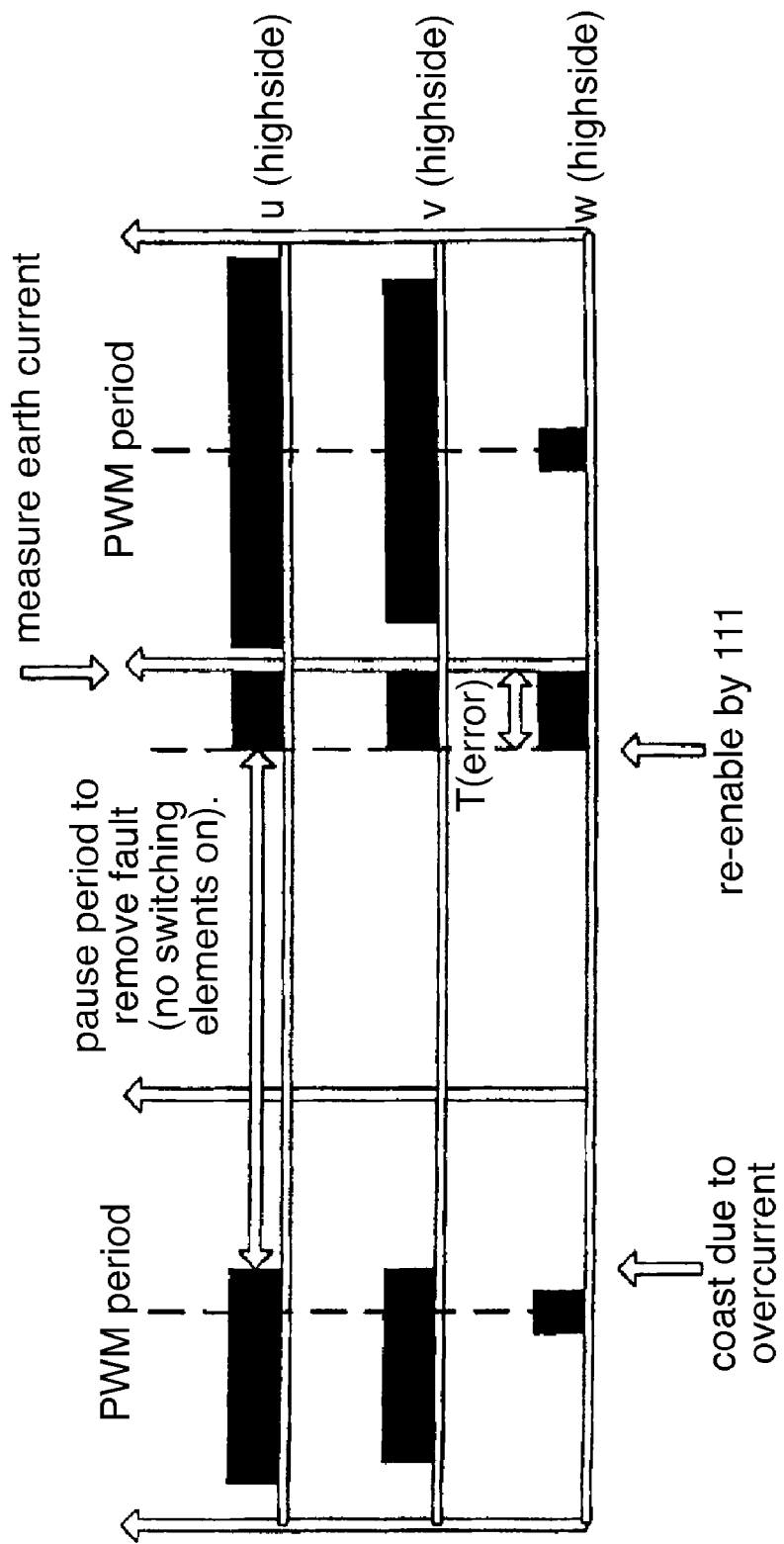
FIG. 5 shows a disable/enable ride-though PWM sequence with item 5 applied while assuming the configuration in FIG. 1.

According to FIG. 5 the short circuit to earth occurs during a voltage vector 110, i.e. high-side switches Q1 and Q3 on, and switch Q5 off. Correspondingly, Q2 and Q4 are off, and Q6 on. FIG. 2 shows the conventional vector circle, which is also used in SFAVM. Vectors 000 or 111 result in a differential-mode no-current condition in the DC-link, i.e. the motor currents are flowing in the inverter bridge only. The current rise due to the earth connection is measured by the current transducer and detected by the current-control circuit, which signals to the DSP. The DSP acknowledges that the motor controller is in an error condition and will now do one of two, based on the amperage of the error current.

1. If the amplitude of the error current is relatively low normal operation is maintained, where normal operation includes the steps in FIG. 4.
2. If the amplitude is high, the controller stops the pulse width modulation of the switches. In this case, operation ceases, and the motor is coasting for a short time. This coasting time may be almost arbitrarily chosen, but a time period corresponding to 1 or more switching period (s) is a good practical choice.

Before resuming operation with PWM control signals on the inverter switches, the step of applying the fault detection vector is performed. The DSP imposes the 111 vector (because the current transducer is placed in the high side; vice versa if it was placed in the low side) and expects a zero-current signal from the current transducer. However, due to the earth-fault connection, a current will flow, and the DSP will stop operation of the motor, because the type of error was identified as an earth-fault.

Generally, the fault signal can be other signals than current signals; it can also be an over- or under-voltage of the DC-link (DC voltage sensor not shown in the Figure). If the fault signal came from the desaturation protection circuit of Q4 instead of coming from the current transducer, the desaturation control circuit would signal this to the DSP, which would act in the same way as just described.

Thus, the motor controller of FIG. 1 is able to dispense operation upon either of two fault signals. If the low-side desaturation circuits are trigged, an earth-fault test may also be made by simply applying the opposite zero-voltage vector 000. This gives an earth-fault test independent on the current sensing.

Figure 3:
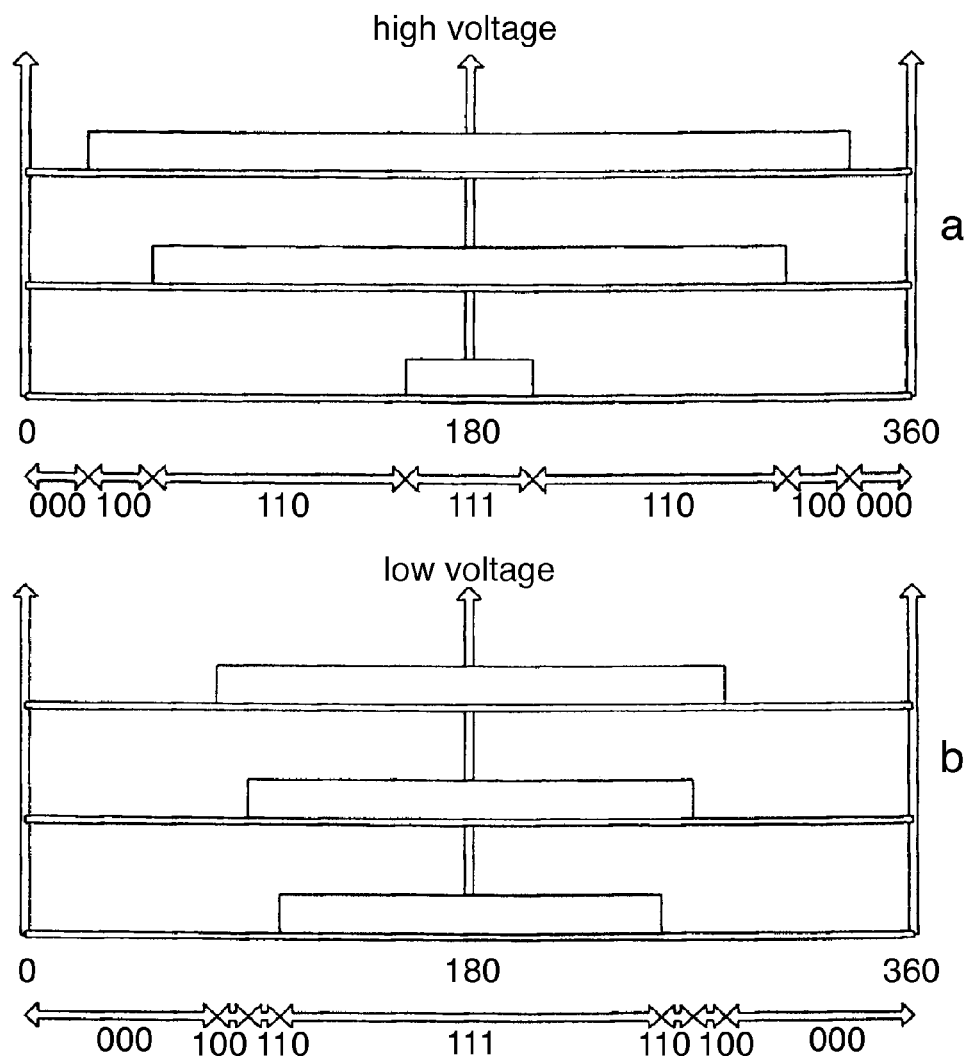
FIG. 3 shows a PWM cycle of SFAVM at low and high output voltage with the zero- and active-voltage vectors shown.

In the following, the timing and the generation of the test vector will be described in detail. FIG. 3a and b shows a conventional SFAVM switching period comprising four different switch states; two zero vectors (000, 111) and two active vectors (100,110). The vectors are symmetrically placed around the 180 degrees centre axis of the switching period. FIG. 3a shows the situation where the output voltage of the motor controller is high. The U-phase is on for nearly the whole period, while the W-phase is on for only a short time. As a part of the conventional modulation scheme, zero vectors are applied in the middle (111) and at the start and end of the period (000). The same applies for the situation in FIG. 3b, where the output voltage to the motor is lower.

In FIG. 5, the high voltage SFAVM pattern on FIG. 3a is repeated. During the fifth vector, 110, the over-current signal described above (or any alternative violation) reaches the DSP, which stops operation. No switching occurs for a period a little longer than a switching period in order—maybe—to remove the cause of the fault, which could be moisture which evaporates during this pause. Also, cooling of the switch itself might relieve the problem. Shortly before commencing operation again, vector 111 is applied. This test zero vector is different from the zero vector applied in the start of the SFAWM scheme of FIG. 3a because the test zero vector is followed by a current measurement in order to identify the type of fault. Also, the pulse length may be different. The duration of the applied test vector is larger than a minimum value to ensure that the earth-fault can be detected in any operating point of the motor; typically it has a duration equal to a fraction of the switching period. The duration may be from 5 to 50 μs, such as between 15 μs and 45 μs, such as between 20 μs and 40 μs, such as between 25 μs and 35 μs. After having applied the test vector, the current is measured, and, if an earth-fault is detected, the inverter operation is again paused before a new test is applied. Alternatively, the drive is tripped permanently. The number of iterations before the test result is accepted as an earth-fault, may be set as desired.

If an earth-fault is not detected, the normal operation can be continued providing the ride-through capability.

The test vector in FIG. 5 is sketched as being positioned prior to the normal PWM. Alternatively, the test vector may be placed in the first PWM period after the re-enabling also, for example as a simple duty-cycle reduction similar to FIG. 4. This is purely a matter of implementation easiness. The important issue is to measure the earth current before an active vector is applied giving differential-mode currents in the DC-link, which may coast the drive again before the earth-fault test can be made.

Figure 4:
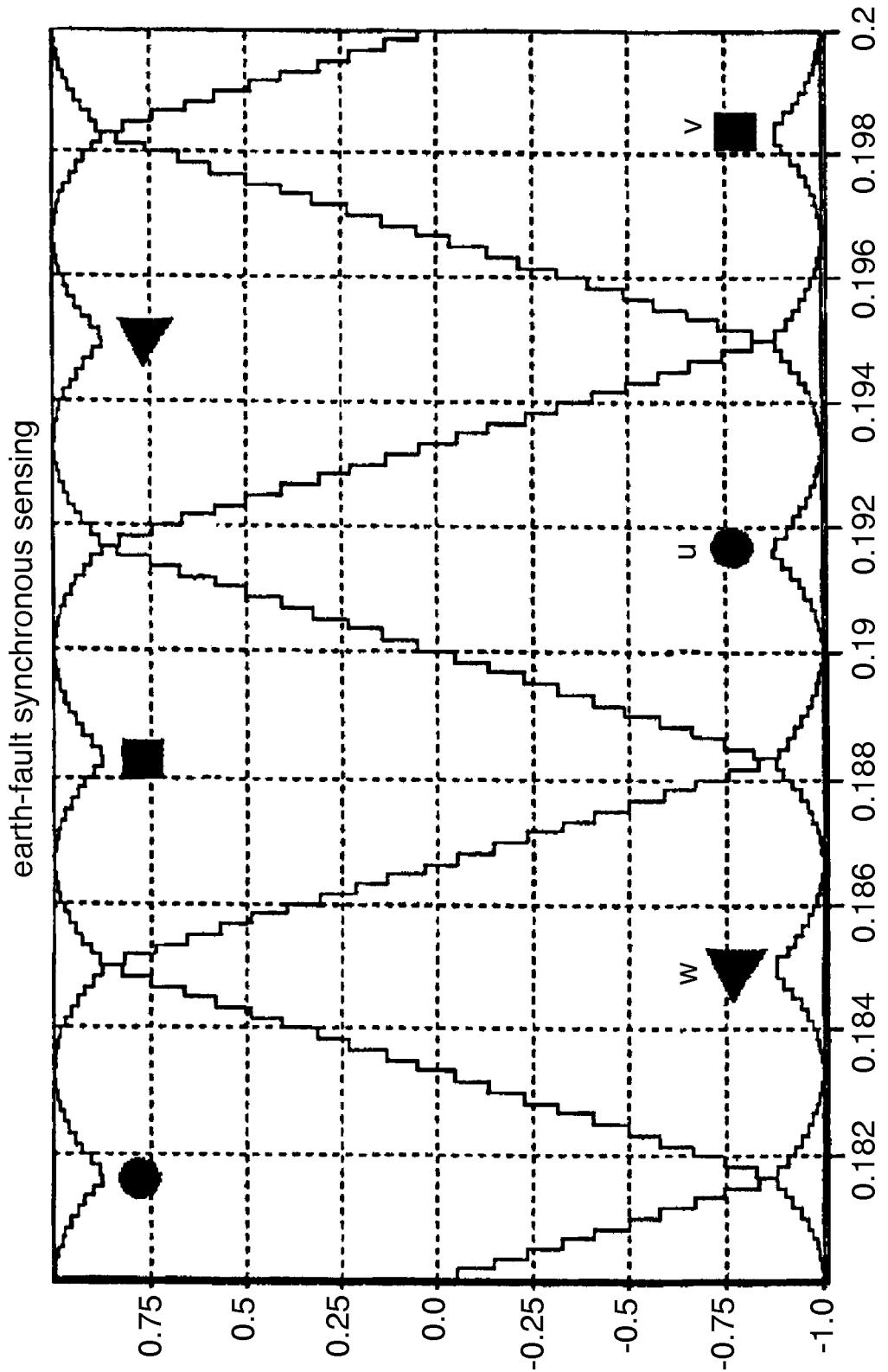
FIG. 4 shows a possible implementation of a phase duty cycle with item 3 applied—the curves should all be offset-adjusted by 1 and divided by 2 to describe the actual duty cycle.

FIG. 4 shows in a diagram form the duty-cycle curves for the high-side switches for each of the three phases U, V and W. The y-axis goes from −1 to 1. The actual duty cycles, which in a known manner is calculated as ton/(ton+toff), may be obtained by the curves in FIG. 4 by adding 1 and dividing by 2. The x-axis is the time in seconds. The phase sequence in FIG. 4 is phase U, V and W.

At a time of approximately 0.185s, the test vector is applied by modifying phase W, which graphically is shown by a triangle in the bottom of the Figure. 120 degrees later, the next test vector is applied by modifying phase U, shown by the bullet in the bottom of the Figure. And again 120 degrees later a third test vector is applied by modifying phase V shown with the square. Applying the test vector introduces an error in the planned switching period. This problem is evident during high voltage demand, and typically results in a lowered output voltage.

To make space for the test vector, the planned duty cycle must be modified, i.e. increased. This is seen in FIG. 4, where the duty cycle of phase W is increased during application of the test vector at approx. 0.185s. The duty cycle is increased from for example 0.06 to 0.12, but to compensate for this, the duty cycle is reduced 180 degrees later (at approx. 0.195s) from 0.94 to 0.88. Thus, the test vector is applied at times where the duty cycle is low, and correction is made when the duty cycle is high.

Preferably, the earth-fault test vector for current sensing including the correction is made with quarter-wave and half-wave symmetry giving minimum distortion in the 3-phase PWM system.

The method of applying a test vector and introducing a correction of the duty cycle as shown in FIG. 4 can be executed without using the method described in FIG. 5. In fact, each of the methods of FIGS. 4 and 5 are independent, but can be combined giving the preferred protection quality. The method of FIG. 4 is running always meaning that the earth-fault current is measured continuously at a rate which is maximum in the millisecond range regardless of a fault condition or not. The duty-cycle modification is applied if necessary at the same rate to obtain the test vector.

The method of FIG. 4 is necessary for earth-fault conditions where the amperage of the error current is relatively low, say 20-30% of the nominal value. This is the case, if the earth-fault connection has a high impedance of e.g. 100 Ohm between the motor phase and earth. Preferably, the rate of applying the test vector in FIG. 4 is lower than the rate of the switching frequency, typically 1 to 10, i.e. 1.5 kHz in relation to a switching frequency of 15 kHz.

What is claimed is:

1. A method for determining the existence of an earth-fault on-the-fly and thereby protecting a motor controller having a high- and a low-side DC-link, and having high- and low-side switching elements, the high- and low-side switching elements being operatively connected to the high- and low-side DC-link buses, respectively, the method comprising the steps of
generating a fault signal, said fault signal indicating abnormal working conditions for the motor controller,
generating at least one test vector in response to the fault signal by switching at least one of the switching elements on, and
measuring, while the at least one of the switching element is on, the magnitude of a current flowing in that DC-link operatively connected to the conducting switching element(s) in order to detect an earth-fault.

2. The method according to claim 1, wherein test vectors are applied by switching the switching elements operatively connected to the high-side DC-link on in a sequential manner.

3. The method according to claim 1, wherein test vectors are applied by switching three switching elements operatively connected to the high-side DC-link on in a sequential manner.

4. The method according to claim 1, wherein test vectors are applied by switching the switching elements operatively connected to the low-side DC-link on in a sequential manner.

5. The method according to claim 1, wherein test vectors are applied by switching three switching elements operatively connected to the low-side DC-link on in a sequential manner.

6. The method according to claim 1, wherein a test vector is applied by switching the switching elements operatively connected to the high-side DC-link on at essentially the same time.

7. The method according to claim 1, wherein a test vector is applied by switching three switching elements operatively connected to the high-side DC-link on at essentially the same time.

8. The method according to claim 1, wherein a test vector is applied by switching the switching elements operatively connected to the low-side DC-link on at essentially the same time.

9. The method according to claim 1, wherein a test vector is applied by switching three switching elements operatively connected to the low-side DC-link on at essentially the same time.

10. The method according to claim 1, wherein the same test vector is applied a number of times, and wherein, during the appliance of said test vector, the magnitude of the current flowing in the DC-link operatively connected to the repeatedly conducting switching element(s) is measured a corresponding number of times.

11. The method according to claim 1, wherein the generated fault signal is provided by current sensing means measuring the current in one of the DC-link buses of the motor controller.

12. The method according to claim 11, wherein the current sensing means provides the magnitude of the current flowing in that DC-link operatively connected to the conducting switching element(s).

13. The method according to claim 1, wherein all steps relating to turning the switching elements on and off, the processing of the fault signal, and the measuring of the magnitude of the current in a DC-link of the motor controller is controlled by a motor controller unit, such as a DSP.

14. The method according to claim 1, wherein generation of the fault signal is an indication for short circuit currents or over currents in one of the DC-link buses of the motor controller.

15. The method according to claim 1, wherein generation of the fault signal is an indication for an over voltage across at least one of the switching elements of the motor controller.

16. The method according to claim 15, wherein a desaturation protection is provided for detecting the over voltage across one of the switching elements of the motor controller.

17. The method according to claim 1, wherein generation of the fault signal is an indication of a fault selected from the group consisting of: abnormal temperature, abnormal voltages, and abnormal currents.

18. The method according to claim 1, further comprising the step of permanently shutting down the motor controller if an earth-fault is determined.

19. The method according to claim 1, further comprising the step of performing the method according to claim 1.

20. A motor controller comprising means adapted to perform a method according to claim 1.

* * * * *